United States Patent
Gillis

(10) Patent No.: US 10,196,001 B2
(45) Date of Patent: Feb. 5, 2019

(54) TAMBOUR DOOR AND STORAGE CONSOLE INCORPORATING A TAMBOUR DOOR

(71) Applicant: FORD GLOBAL TECHNOLOGIES, LLC, Dearborn, MI (US)

(72) Inventor: Francis Raymond Gillis, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/634,122

(22) Filed: Jun. 27, 2017

(65) Prior Publication Data
US 2018/0370445 A1     Dec. 27, 2018

(51) Int. Cl.
*B60R 7/04*     (2006.01)
*E05D 15/06*     (2006.01)

(52) U.S. Cl.
CPC ............ *B60R 7/04* (2013.01); *E05D 15/0621* (2013.01)

(58) Field of Classification Search
CPC .............. B60R 7/04; B60R 7/046; B60R 7/06
USPC ............ 296/24.34; 312/350, 297; 220/345.1, 220/349–351; 160/218, 229.1, 160/231.1–231.2
See application file for complete search history.

(56) References Cited

U.S. PATENT DOCUMENTS

| | | | | |
|---|---|---|---|---|
| 3,837,464 A * | 9/1974 | Baughman | .............. | B41J 29/13 312/208.3 |
| 5,065,808 A * | 11/1991 | Hopperdietzel | ........ | E06B 9/115 160/229.1 |
| 6,158,123 A * | 12/2000 | Bryson | .................... | B23P 15/00 29/434 |
| 6,250,729 B1 | 6/2001 | Allison et al. | | |
| 6,499,785 B2 * | 12/2002 | Eguchi | ...................... | B60R 7/04 160/201 |
| 7,475,954 B1 * | 1/2009 | Latunski | ................. | B60R 11/00 296/24.34 |
| 8,033,588 B2 * | 10/2011 | Luginbill | .................. | B60R 7/04 296/24.34 |
| 8,235,567 B2 * | 8/2012 | Hipshier | ............... | B60Q 3/225 362/154 |
| 8,573,665 B2 | 11/2013 | Hipshier | | |
| 8,726,971 B2 * | 5/2014 | Sato | ......................... | B60R 7/04 160/231.2 |
| 8,925,616 B2 * | 1/2015 | Ganz | ....................... | B60N 3/08 160/231.2 |
| 9,481,323 B2 * | 11/2016 | Hipshier | ............. | B29C 45/1676 |

(Continued)

FOREIGN PATENT DOCUMENTS

DE          4010241     *   4/1991
DE     102013106903 A1     7/2014
(Continued)

OTHER PUBLICATIONS

English Machine Translation of DE102013106903A1.

*Primary Examiner* — Dennis H Pedder
(74) *Attorney, Agent, or Firm* — Vichit Chea; King & Schickli, PLLC

(57) ABSTRACT

A storage console includes a housing having a storage chamber, an access opening and a guide track. The storage console also includes a tambour door including an articulated substrate and a plurality of slats carried on the articulated substrate. The articulated substrate includes integral overmolded guides and integral overmolded splines.

18 Claims, 9 Drawing Sheets

(56) References Cited

U.S. PATENT DOCUMENTS

| | | | |
|---|---|---|---|
| 2002/0041115 A1* | 4/2002 | Johannes Manders | B60J 7/02 296/223 |
| 2002/0070220 A1* | 6/2002 | Kuehn | B65D 43/20 220/350 |
| 2004/0130174 A1* | 7/2004 | Laskey | B60N 3/102 296/37.1 |
| 2006/0186696 A1* | 8/2006 | Dobos | B60R 7/04 296/152 |
| 2007/0102463 A1* | 5/2007 | Thomas | B60R 7/04 224/275 |
| 2013/0049389 A1* | 2/2013 | Hipshier | B29C 44/086 296/1.08 |
| 2014/0167435 A1* | 6/2014 | Sherburn | B60N 3/102 296/1.08 |
| 2015/0151656 A1* | 6/2015 | Bozio | B60N 2/4646 296/24.34 |
| 2015/0258939 A1* | 9/2015 | Hipshier | B60R 7/04 160/229.1 |
| 2018/0118121 A1* | 5/2018 | Gorman, Jr. | B60R 7/04 |

FOREIGN PATENT DOCUMENTS

| | | | |
|---|---|---|---|
| EP | 596389 | * | 5/1994 |
| FR | 2670101 | * | 12/1990 |

* cited by examiner

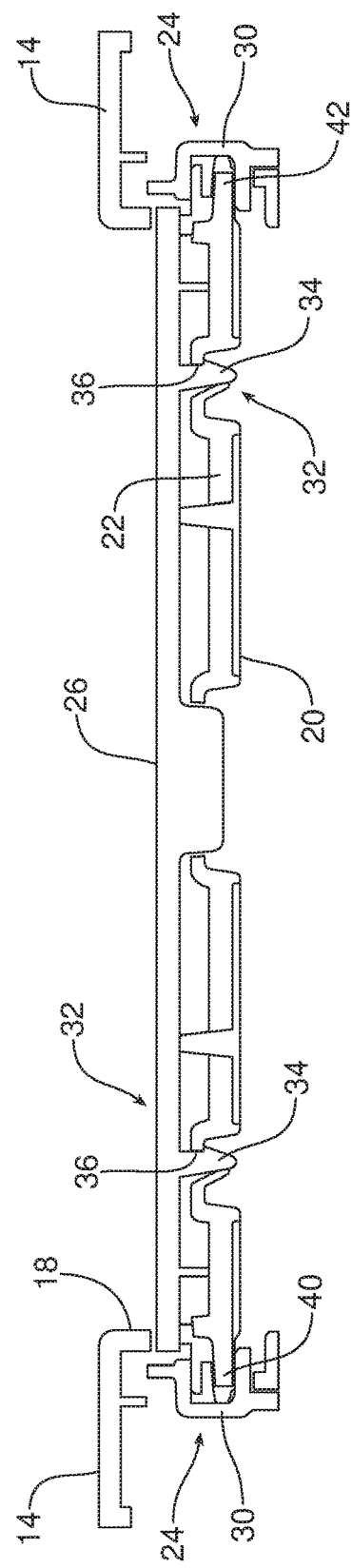

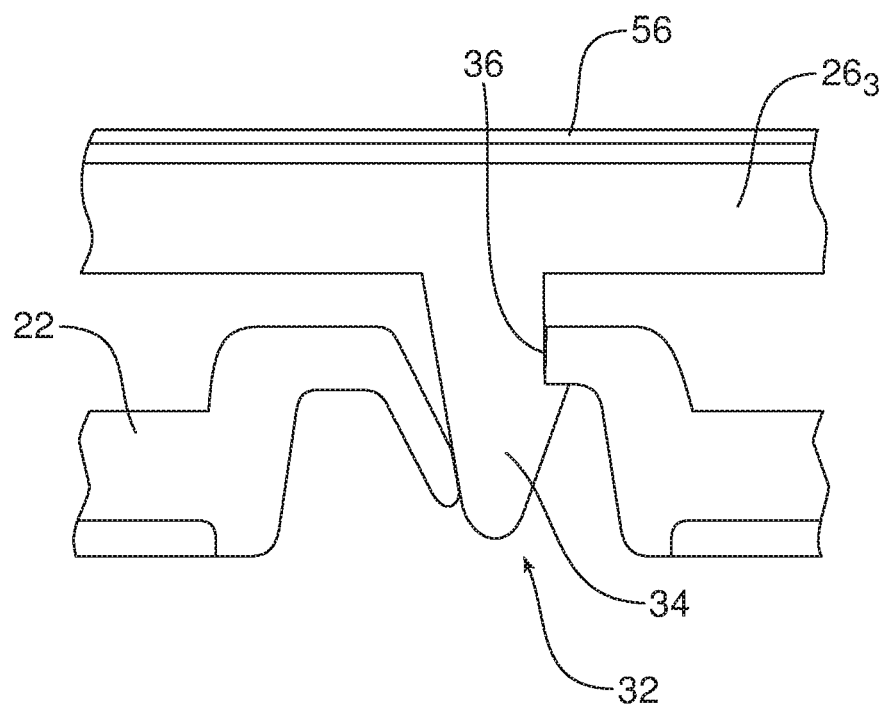

TAMBOUR DOOR AND STORAGE CONSOLE INCORPORATING A TAMBOUR DOOR

TECHNICAL FIELD

This document relates generally to the motor vehicle equipment field and, more particularly, to a new and improved tambour door as well as to a storage console incorporating that tambour door.

BACKGROUND

Storage consoles incorporating a tambour door are known in the art. See, for example, U.S. Pat. No. 6,250,729 owned by Ford Global Technologies, LLC.

This document relates to a new and improved hard tambour door execution that allows for a multitude of finish options including, for example, painted/filmed plastic, wood, aluminum, carbon fiber, metal mesh or the like. The new and improved tambour door also delivers quiet operation with smooth and consistent effort throughout the length of travel when displacing the tambour door between fully opened and fully closed positions.

SUMMARY

In accordance with the purposes and benefits described herein, a new and improved tambour door is provided. That tambour door comprises (a) an articulated substrate, including integral overmolded guides, and (b) a plurality of slats carried on the articulated substrate.

The articulated substrate may further include integral overmolded splines extending between the plurality of slats. The integral overmolded guides and the integral overmolded splines may be made from a thermoplastic elastomer so as to better allow for smooth and consistent sliding action and quiet operation. The resulting high-quality feel generated during operation of the tambour door enhances user satisfaction.

The tambour door may further include a fastening feature for securing the plurality of slats to the articulated substrate. That fastening feature may include a plurality of hooks on the plurality of slats that are engaged with a plurality of receivers on the articulated substrate.

The articulated substrate may include a plurality of lateral ribs and the plurality of receivers may be provided in the plurality of lateral ribs. Each rib of the plurality of lateral ribs may include a first end and a second end. The integral overmolded guides may be provided at the first and second ends of each rib. The integral overmolded splines may extend between opposed side walls of adjacent slats of the plurality of slats.

Each integral overmolded guide may include a primary projection, a secondary projection and a channel defined between the primary projection and the secondary projection. Each integral overmolded guide may also include a support face engaging one slat of the plurality of slats.

In accordance with another aspect, a new and improved storage console may be provided. That storage console comprises a housing including a storage chamber, an access opening and a guide track. Further, the storage console also comprises a tambour door. That tambour door includes an articulated substrate having integral overmolded guides and a plurality of slats carried on the articulated substrate. The integral overmolded guides slide consistently and smoothly along the guide track allowing the tambour door to be displaced between a first position closing the access opening to conceal the storage chamber and a second position opening the access opening to access the storage chamber.

The articulated substrate may further include integral overmolded splines extending between the plurality of slats. In addition, a fastening feature may be provided for securing the plurality of slats to the articulated substrate. That fastening feature may include a plurality of hooks on the plurality of slats that engage with a plurality of receivers on the articulated substrate.

In some of the many possible embodiments, the articulated substrate may include a plurality of lateral ribs. The plurality of receivers may be provided in the plurality of lateral ribs. Further, each rib of the plurality of lateral ribs may include a first end and a second end. The integral overmolded guides may be provided at the first and second ends of each rib. In addition, the integral overmolded splines may extend between opposed side walls of adjacent slats of the plurality of slats. In addition, each integral overmolded guide may include a primary projection, a secondary projection and a channel defined between the primary projection and the secondary projection. Each integral overmolded guide may also include a support surface engaging one slat of the plurality of slats.

In the following description, there are shown and described several preferred embodiments of the tambour door and the storage console. As it should be realized, the tambour door and the storage console are capable of other, different embodiments and their several details are capable of modification in various, obvious aspects all without departing from the tambour door and storage console as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tambour door and the storage console and together with the description serve to explain certain principles thereof.

Figure 4A:
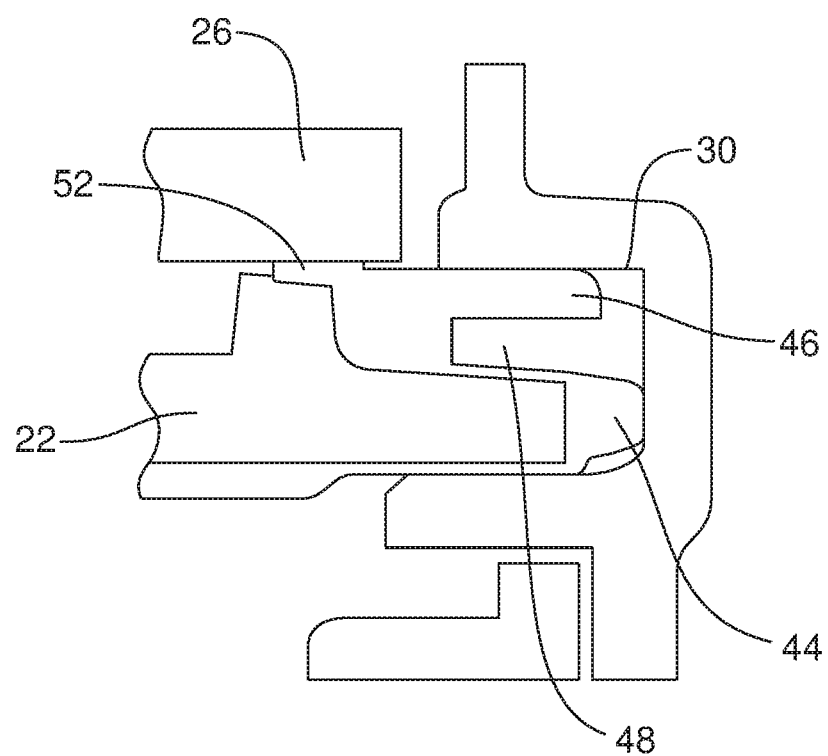
FIG. 4 is a detailed cross-sectional view taken along line 4-4 of FIG. 3 and including separate detailed views of the fastening feature and slat construction as well as the interface between the integral overmolded guide and the guide track provided in the housing of the storage console.

FIG. 4*a* is a detailed view of an integral overmolded guide received in a guide track.

Figure 4B:
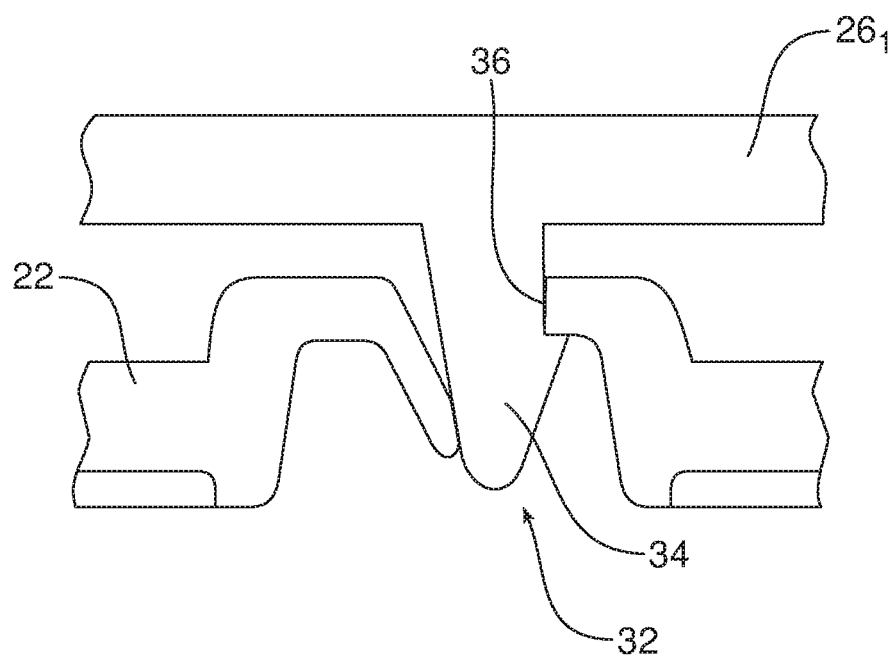
Figure 4C:
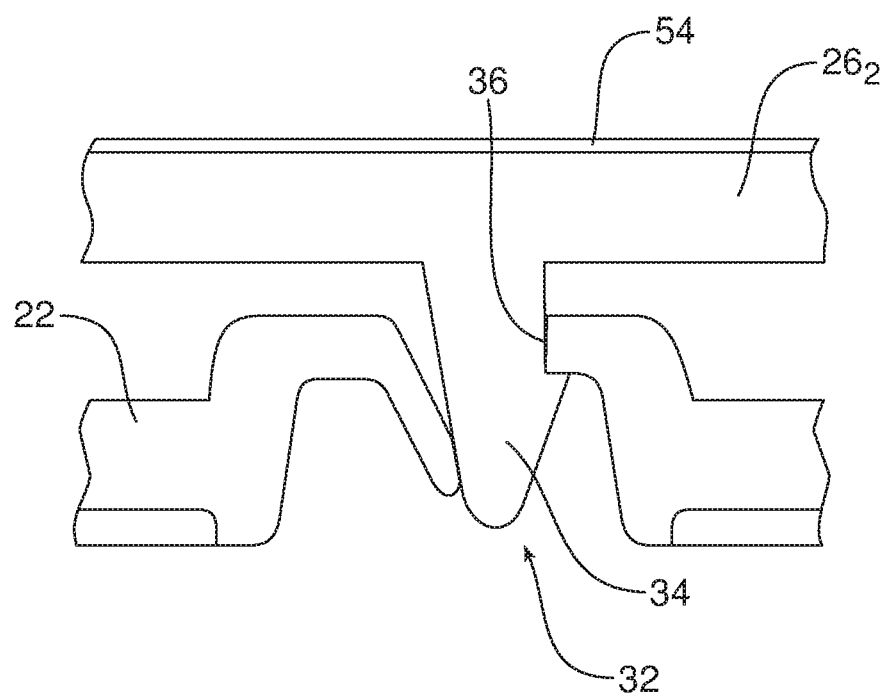

FIGS. 4*b*-4*d* are detailed fragmentary views of the three possible slat constructions.

Figure 3:
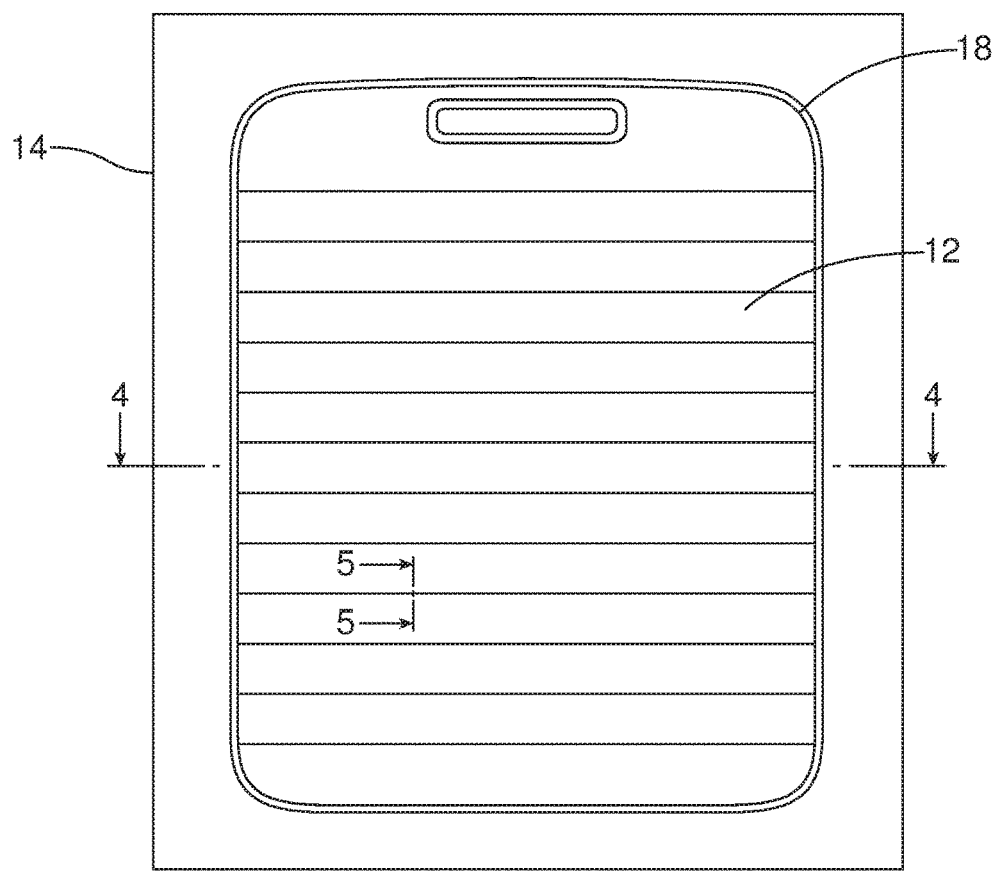
FIG. 3 is a detailed top plan view of the tambour door in the storage console.
Figure 5:
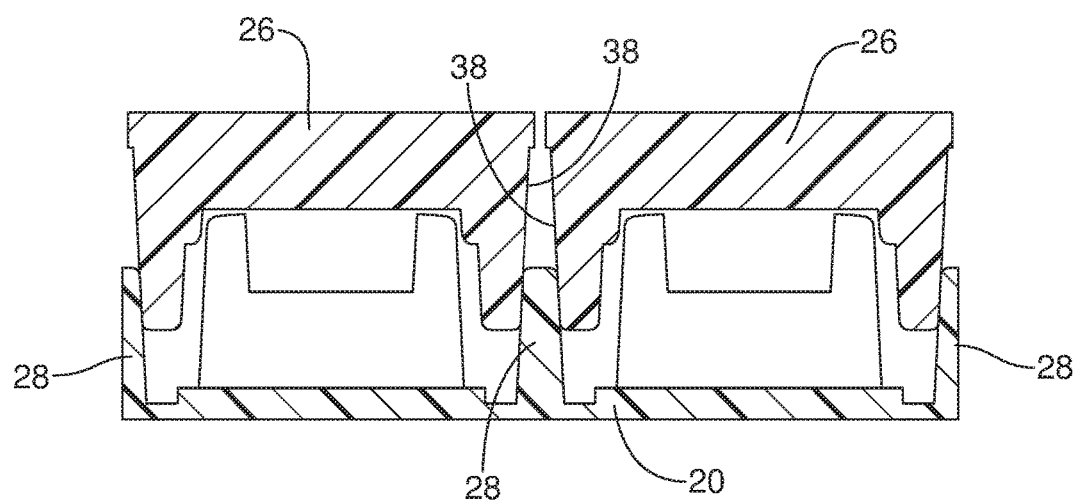

FIG. 5 is a cross-sectional view taken along 5-5 of FIG. 3 illustrating in detail how the splines extend between opposed side walls of adjacent slats.

Reference will now be made in detail to the present preferred embodiments of the tambour door and storage console, examples of which are illustrated in the accompanying drawing figures.

DETAILED DESCRIPTION

Figure 1:
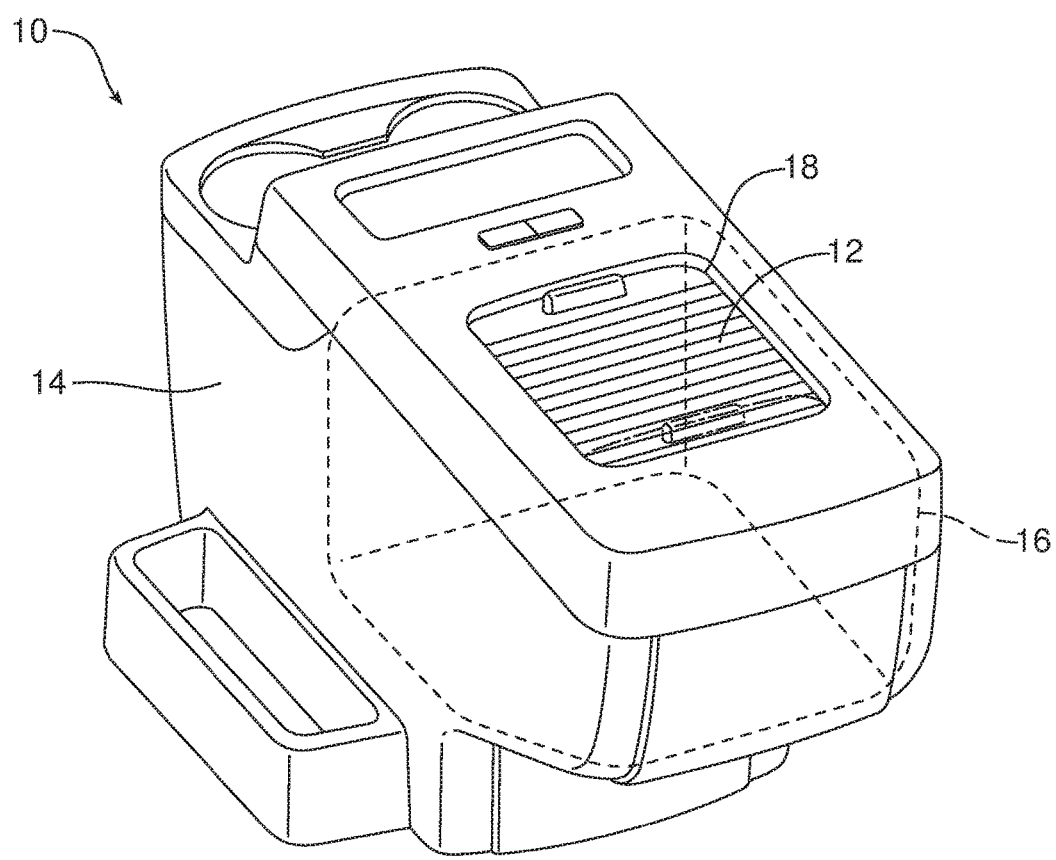
FIG. 1 is a perspective view of the storage console incorporating the new and improved tambour door.

Reference is now made to FIG. 1 illustrating a storage console 10 equipped with the new and improved tambour door 12. The storage console 10 includes a housing 14 including an internal storage chamber 16, an access opening 18 to access the storage chamber and a guide track 30 for supporting the tambour door 12 as it is displaced between a first position (illustrated in full line in FIG. 1) closing the access opening 18 and concealing the storage chamber and a second position (illustrated in phantom line in FIG. 1) opening the access opening to access the storage chamber.

Figure 2:
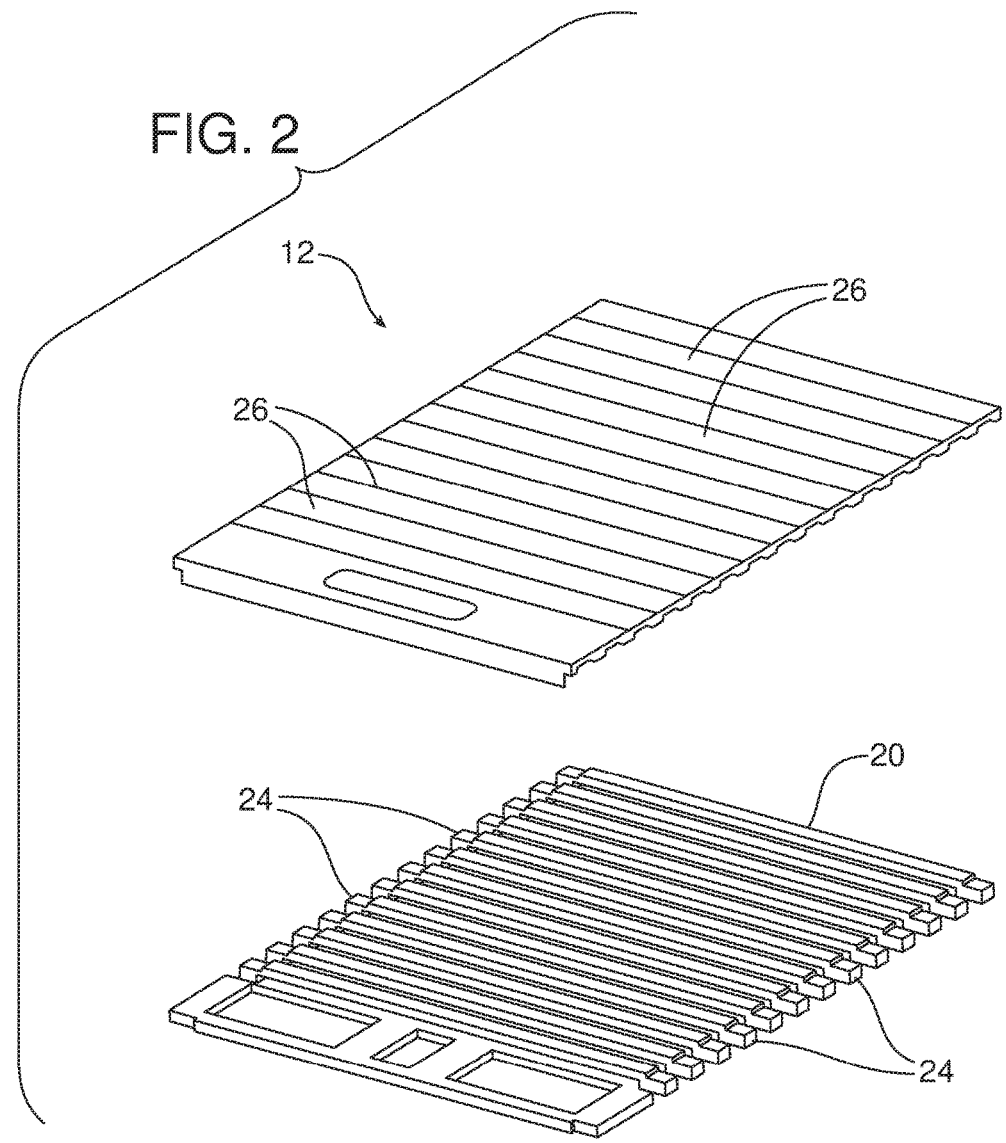
FIG. 2 is a detailed exploded perspective view of the new and improved tambour door.

As best illustrated in FIGS. 2, 4 and 5, the tambour door 12 includes an articulated substrate 20 including a plurality of lateral ribs 22 and integral overmolded guides 24. Further, the tambour door 12 includes a plurality of slats 26 that are carried on the articulated substrate 20.

As will be apparent from the following description, the integral overmolded guides 24 slide along a guide track 30 provided in the housing 14 of the storage console 10 allowing the tambour door 12 to be smoothly and consistently displaced with a constant and user friendly effort or pressure between the first position closing the access opening 18 and the second position opening the access opening.

The articulated substrate 20 illustrated in the drawing figures also includes integral overmolded splines 28 extending between the plurality of slats 26. Advantageously, the integral overmolded guides 24 and splines 28 function together to provide smooth consistent and noiseless operation of the tambour door.

As should be appreciated, such a tambour door 12 may be made utilizing a two-shot injection molding process. The first step of that process involves the molding of the articulated substrate 20, including the lateral ribs 22, from an appropriate relatively hard or rigid plastic material such as acrylonitrile butadiene styrene (ABS), polycarbonate-acrylonitrile butadiene styrene (PC/ABS) or another amorphous material. The second step of the process involves the injection molding of the overmolded guides 24 and overmolded splines 28 from an appropriate smooth sliding and relatively soft material such as thermoplastic elastomer (TPE). That TPE material may also include a molded in lubricant to enhance the smooth sliding operation of the tambour door 12 along the guide track 30 in the housing 14. Such a lubricant may comprise, for example, silicone.

A fastening feature, generally designated by reference numeral 32, may be provided to secure the plurality of slats 26 to the articulated substrate 20. In the illustrated embodiment, the fastening feature 32 comprises a plurality of resilient hooks 34 provided on the plurality of slats 26. Those hooks 34 engage with a plurality of receivers 36 provided on the articulated substrate 20 and, more particularly, in the plurality of lateral ribs 22 of the articulated substrate. Advantageously, the cooperating hooks 34 and receivers 36 allow the plurality of slats 26 and the articulated substrate 20 to be snapped together in a quick and efficient manner yet securely retained together. When the plurality of slats 26 are properly seated on the articulated substrate 20, the overmolded splines 28 extend between opposed side walls 38 of adjacent slats as best illustrated in FIG. 5.

As best illustrated in FIG. 4, each rib 22 of the plurality of lateral ribs includes a first end 40 and a second end 42. The integral overmolded guides 24 are provided at the first end 40 and the second end 42 of each rib 22.

As illustrated in FIGS. 4 and 4a, each integral overmolded guide 24 includes a primary projection 44, a secondary projection 46 and a channel 48 defined between the primary projection and the secondary projection. FIG. 4 illustrates how the overmolded guides 24 at the first and second ends 40, 42 of each rib 22 are received in the opposed rails of the guide track 30 provided in the housing 14. As also best illustrated in FIG. 4a, it should be appreciated that each integral overmolded guide 24 includes a support face 52 for engaging an end of one slat 26. Together, the "soft" overmolded splines 28 between individual slats 26 and the "soft" support faces 52 at the ends 40, 42 of each slat cradle the slats in a yielding manner for enhanced performance.

As illustrated in FIGS. 4b-4d, the articulated substrate 20 and the fastening feature 32 provide a versatility that allows one to utilize a number of different slat constructions. For example, slat $26_1$ shown in FIG. 4b is a molded in color or painted plastic slat. Slat 262 shown in FIG. 4c is a plastic substrate 53 covered with a decorative film 54. Slat 263 shown in FIG. 4d is a plastic substrate 55 covered with wood, aluminum, carbon fiber, other metal or decorative material 56.

As should be appreciated from the foregoing, the disclosed tambour door 12 construction allows the finished appearance of the tambour door to be independent of the functional interface with the storage console housing. The tambour door 12 allows for slats 26 of various constructions and designs, freeing designers to utilize more interesting and appealing materials. At that the same time, the integral overmolded guides 24 and splines 28 of the articulated substrate 20 allow for smooth, consistent and quiet operation with an effort that instills a sense of quality and craftsmanship. Advantageously, the two-shot molding process used to produce the articulated substrate 20 is both efficient and cost-effective.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tambour door, comprising:
an articulated substrate including integral overmolded guides and integral overmolded splines; and
a plurality of slats carried on said articulated substrate wherein said integral overmolded splines extend between said plurality of slats.

2. The tambour door of claim 1, wherein said integral overmolded guides and said integral overmolded splines are made from thermoplastic elastomer.

3. The tambour door of claim 1, further including a fastening feature securing said plurality of slats to said articulated substrate.

4. The tambour door of claim 3, wherein said fastening feature includes a plurality of hooks on said plurality of slats engaged with a plurality of receivers on said articulated substrate.

5. The tambour door of claim 4, wherein said articulated substrate includes a plurality of lateral ribs, said plurality of receivers being provided in said plurality of lateral ribs.

6. The tambour door of claim 5, wherein each rib of said plurality of lateral ribs includes a first end and a second end.

7. The tambour door of claim 6, wherein said integral overmolded guides are provided at said first end and said second end of said each rib.

8. The tambour door of claim 7, wherein said integral overmolded splines extend between opposed side walls of adjacent slats of said plurality of slats.

9. The tambour door of claim 8, wherein each integral overmolded guide includes a primary projection, a secondary projection and a channel defined between said primary projection and said secondary projection.

10. The tambour door of claim 9, wherein each integral overmolded guide includes a support face engaging one slat of said plurality of slats.

11. A storage console, comprising:
a housing including a storage chamber, an access opening and a guide track; and
a tambour door including (a) an articulated substrate, including integral overmolded guides and integral overmolded spines, and (b) a plurality of slats carried on said articulated substrate wherein said integral overmolded splines extend between said plurality of slats and said integral overmolded guides slide along said guide track whereby said tambour door may be displaced between a first position closing said access opening and a second position opening said access opening.

12. The storage console of claim 11, further including a fastening feature securing said plurality of slats to said articulated substrate.

13. The storage console of claim 12, wherein said fastening feature includes a plurality of hooks on said plurality of slats engaged with a plurality of receivers on said articulated substrate.

14. The storage console of claim 13, wherein said articulated substrate includes a plurality of lateral ribs, said plurality of receivers being provided in said plurality of lateral ribs.

15. The storage console of claim 14, wherein each rib of said plurality of lateral ribs includes a first end and a second end.

16. The storage console of claim 15, wherein said integral overmolded guides are provided at said first end and said second end of said each rib.

17. The storage console of claim 16, wherein said integral overmolded splines extend between opposed side walls of adjacent slats of said plurality of slats.

18. The storage console of claim 17, wherein each integral overmolded guide includes a primary projection, a secondary projection and a channel defined between said primary projection and said secondary projection and wherein each integral overmolded guide includes a support face engaging one slat of said plurality of slats.

* * * * *